US008253656B2

(12) United States Patent
Park et al.

(10) Patent No.: US 8,253,656 B2
(45) Date of Patent: Aug. 28, 2012

(54) PLASMA DISPLAY APPARATUS AND METHOD OF DRIVING THE SAME

(75) Inventors: Kirack Park, Gumi (KR); Jongwoon Bae, Gumi (KR); Seonghwan Ryu, Gumi (KR)

(73) Assignee: LG Electronics Inc., Seoul (KR)

( * ) Notice: Subject to any disclaimer, the term of this patent is extended or adjusted under 35 U.S.C. 154(b) by 1234 days.

(21) Appl. No.: 12/029,923

(22) Filed: Feb. 12, 2008

(65) Prior Publication Data

US 2009/0085835 A1 Apr. 2, 2009

(30) Foreign Application Priority Data

Sep. 28, 2007 (KR) ........................ 10-2007-0098101

(51) Int. Cl.
*G09G 3/28* (2006.01)
*G09G 3/10* (2006.01)
*G06F 3/038* (2006.01)

(52) U.S. Cl. ............ 345/60; 345/67; 345/204; 345/208; 345/214; 315/169.4

(58) Field of Classification Search .................... 345/30, 345/37, 41, 55, 60–68, 106, 204, 208–210, 345/214; 315/160–169.4; 313/483–486, 313/582, 584, 586–587

See application file for complete search history.

(56) References Cited

U.S. PATENT DOCUMENTS

2006/0087480 A1 4/2006 Kim et al. ........................ 345/63

FOREIGN PATENT DOCUMENTS

| | | | |
|---|---|---|---|
| EP | 1 715 471 | A2 | 10/2006 |
| KR | 10-2005-0012467 | A | 2/2005 |
| KR | 10-2006-0011774 | A | 2/2006 |
| KR | 10-0570628 | B1 | 4/2006 |
| KR | 10-2006-0054756 | A | 5/2006 |
| KR | 10-2007-0072055 | A | 7/2007 |

OTHER PUBLICATIONS

PCT International Search Report and Written Opinion dated May 14, 2008.

European Search Report dated Jul. 22, 2010 issued in Application No. 08 70 4715.

*Primary Examiner* — Lun-Yi Lao
*Assistant Examiner* — Jarurat Suteerawongsa
(74) *Attorney, Agent, or Firm* — Ked & Associates LLP

(57) ABSTRACT

A plasma display apparatus and a method of driving the same are disclosed. The plasma display apparatus includes a plasma display panel including scan electrodes and sustain electrodes, a sensor unit for detecting a temperature or a peripheral temperature of the panel, and a scan driver for supplying reset signals to the scan electrodes in a reset period of at least one subfield among a plurality of subfields at a predetermined reference temperature so that a first period in which a lowest voltage of the reset signal is supplied is different from a supply period of a lowest voltage when the temperature or the peripheral temperature of the PDP deviates the predetermined reference temperature.

17 Claims, 8 Drawing Sheets

FIG. 5

| DIFFERENCE BETWEEN FIRST SUSTAIN BIAS VOLTAGE AND SECOND SUSTAIN BIAS VOLTAGE (V) | ADDRESS DISCHARGE | SUSTAIN DISCHARGE | ERRONEOUS DISCHARGE |
|---|---|---|---|
| 1 V | ○ | △ | △ |
| 2 V | ○ | △ | △ |
| 3 V | ◎ | ○ | ○ |
| 4 V | ◎ | ◎ | ◎ |
| 5 V | ◎ | ◎ | ◎ |
| 6 V | ◎ | ◎ | ◎ |
| 7 V | ◎ | ○ | ○ |
| 8 V | ◎ | ○ | ○ |
| 9 V | ◎ | ○ | ○ |
| 10 V | ◎ | ○ | ○ |
| 11 V | ◎ | △ | X |
| 12 V | ◎ | △ | X |

PLASMA DISPLAY APPARATUS AND METHOD OF DRIVING THE SAME

This application claims the benefit of Korean Patent Application No. 10-2008-0098101 filed on Sep. 28, 2007, which is hereby incorporated by reference.

BACKGROUND OF THE DISCLOSURE

1. Field of the Disclosure

This document relates to a plasma display apparatus and a method of driving the same.

2. Description of the Related Art

In general, in a plasma display panel (PDP), barrier ribs formed between a top surface panel and bottom surface panel form a unit discharge cell. Each discharge cell is filled with a main discharge gas such as neon (Ne), helium (He), or a gas mixture of Ne and He (Ne+He) and an inert gas comprising a small amount of xenon. A plurality of unit discharge cells form one pixel. For example, red R cells, green (G) cells, and blue (B) cells are gathered to form one pixel. When a radiofrequency voltage is supplied to the unit discharge cells so that discharge is generated, the inert gas generates vacuum ultraviolet (UV) rays and emits light from phosphors formed between the barrier ribs so that an image is displayed. Since the PDP can be made thin and light, the PDP is spotlighted as a next generation display.

A plurality of electrodes, for example, scan electrodes Y, sustain electrodes Z, and address electrodes X and drivers for driving the electrodes are attached to the PDP to form a plasma display apparatus.

SUMMARY OF THE DISCLOSURE

An aspect of this document is to provide a plasma display apparatus in which a period for which the lowest voltage of reset signals is supplied varies with each subfield so that it is possible to prevent erroneous discharge from being generated and to stably generate discharge and a method of driving the same.

In an aspect, there is provided a plasma display apparatus, comprising a plasma display panel (PDP) comprising scan electrodes and sustain electrodes, a sensor unit for detecting a temperature or a peripheral temperature of the PDP, and a scan driver for supplying reset signals to the scan electrodes in a reset period of at least one subfield among a plurality of subfields at a predetermined reference temperature so that a first period in which a lowest voltage of the reset signal is supplied is different from a supply period of a lowest voltage when the temperature or the peripheral temperature of the PDP deviates the predetermined reference temperature.

In addition, the plurality of subfields comprises first subfields and second subfields. When the temperature or the peripheral temperature of the PDP is comprised in the reference temperature, periods in which the lowest voltage of the reset signals are supplied in reset periods of the first subfields are referred to as first maintenance periods and periods in which the lowest voltage of the reset signals are supplied in reset period of the second subfields are referred to as second maintenance period. When the temperature or the peripheral temperature of the PDP is comprised in the reference temperature, in a case where periods in which the lowest voltage of the reset signals are supplied in reset periods of the first subfields are referred to as third maintenance periods and periods in which the lowest voltage of the reset signals are supplied in reset period of the second subfields are referred to as fourth maintenance periods, are actually the same and the second maintenance periods are actually longer than the fourth maintenance period. In another aspect, there is provided a method of driving a plasma display apparatus comprising scan electrodes and sustain electrodes, the method comprising detecting a temperature or a peripheral temperature of the PDP and supplying reset signals to the scan electrodes in a reset period of at least one subfield among a plurality of subfields at a predetermined reference temperature so that a first period in which a lowest voltage of the reset signal is supplied is different from a supply period of a lowest voltage when the temperature or the peripheral temperature of the PDP deviates the predetermined reference temperature.

As described above, in the plasma display apparatus according to an embodiment of the present invention, a maintenance period in which the lowest voltage of the reset signals is sustained varies with each subfield. Therefore, it is possible to prevent erroneous discharge from being generated and to prevent the image quality of an image from deteriorating.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention. In the drawings:

FIG. 5 describes a relationship between a first sustain bias voltage and a second sustain bias voltage according to an embodiment of the present invention;

DETAILED DESCRIPTION OF EMBODIMENTS

Embodiments will be described in a more detailed manner with reference to the drawings.

Figure 1:
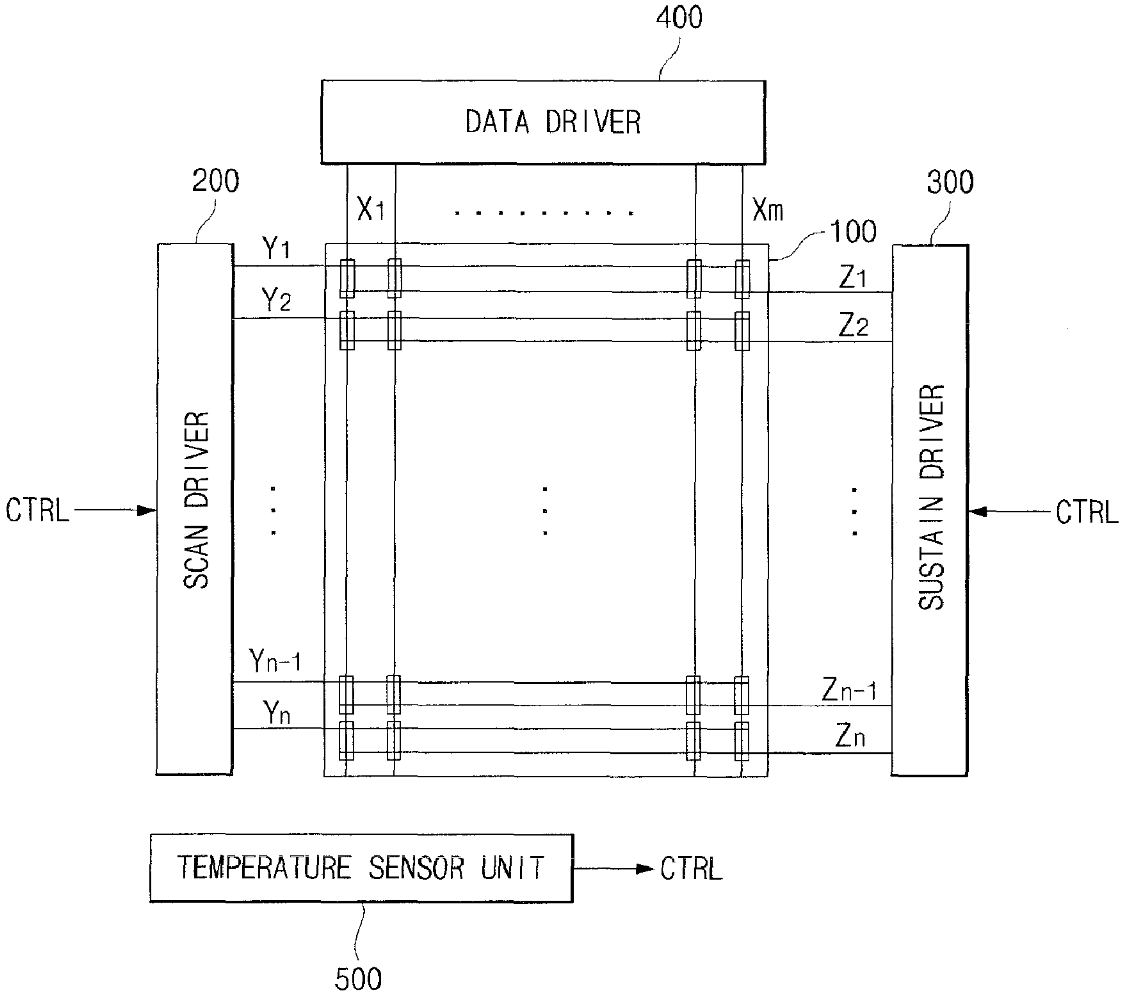
FIG. 1 illustrates a plasma display apparatus according to an embodiment of the present invention.

FIG. 1 illustrates a plasma display apparatus according to an embodiment of the present invention.

Referring to FIG. 1, the plasma display apparatus according to an embodiment of the present invention comprises a plasma display panel (PDP) 100, a scan driver 200, a sustain driver 300, a data driver 400, and a temperature sensor unit 500.

In the PDP 100, a top surface panel (not shown) and a bottom surface panel (not shown) are attached to each other by a predetermined distance. The PDP 100 comprises scan electrodes Y1 to Yn, sustain electrodes Z1 to Zn, and address electrodes X1 to Xm.

The scan driver 200 supplies reset signals to the scan electrodes Y1 to Yn so that wall charges are uniformly formed in discharge cells in a reset period.

At this time, the scan driver 200 supplies the reset signals to the scan electrodes in the reset periods of a plurality of subfields so that a period in which the lowest voltage of the reset signals are supplied varies in accordance with the temperature and the peripheral temperature of the PDP. The scan driver 200 supplies scan signals for selecting discharge cells in which discharge is to be generated to the scan electrodes Y1 to Yn in the address period and supplies sustain signals to generate sustain discharge in the selected discharge cells to the scan electrodes Y1 to Yn in a sustain period.

In addition, the scan driver 200 can supply erase signals to the scan electrodes Y1 to Yn after the last sustain signal.

The sustain driver 300 supplies sustain bias signals to the sustain electrodes Z1 to Zn in a set down period and in the address period. At this time, the sustain bias signals comprise a first sustain bias voltage and a second sustain bias voltage having a different voltage from the first sustain bias voltage.

In addition, the sustain driver 300 supplies sustain signals to the sustain electrodes Z1 to Zn in a sustain period.

In addition, the data driver 400 supplies data signals to the address electrodes X1 to Xm in the address period in response to data timing control signals supplied from a timing controller (not shown) to correspond to the scan electrodes Y1 to Yn.

The temperature sensor unit 500 comprising a temperature sensor (not shown) detects the temperature or the peripheral with a reference temperature to output control signals CTRL for controlling at least one of the scan driver 200 and the sustain driver 300. The reference temperature according to an embodiment of the present invention of the present invention is no less than 0 degree and no more than 40 degrees and a higher temperature than the reference temperature is a high temperature larger than 40 degrees.

The temperature sensor 500 outputs the control signals CTRL to at least one of the scan driver 200 and the sustain driver 300 when the temperature or the peripheral temperature of the PDP 100 is higher than the reference temperature.

The scan driver 200 that receives the control signals CTRL from the temperature sensor 500 makes periods in which the lowest voltages of the reset signals are supplied the same from a first subfield to a fourth subfield among the plurality of subfields and reduces the periods in which the lowest voltages of the reset signals are supplied in the remaining subfields excluding first to fourth subfields to supply the control signals CTRL to the scan electrodes Y1 to Yn.

The structure of the PDP comprised in the plasma display apparatus will be described as follows.

Figure 2:
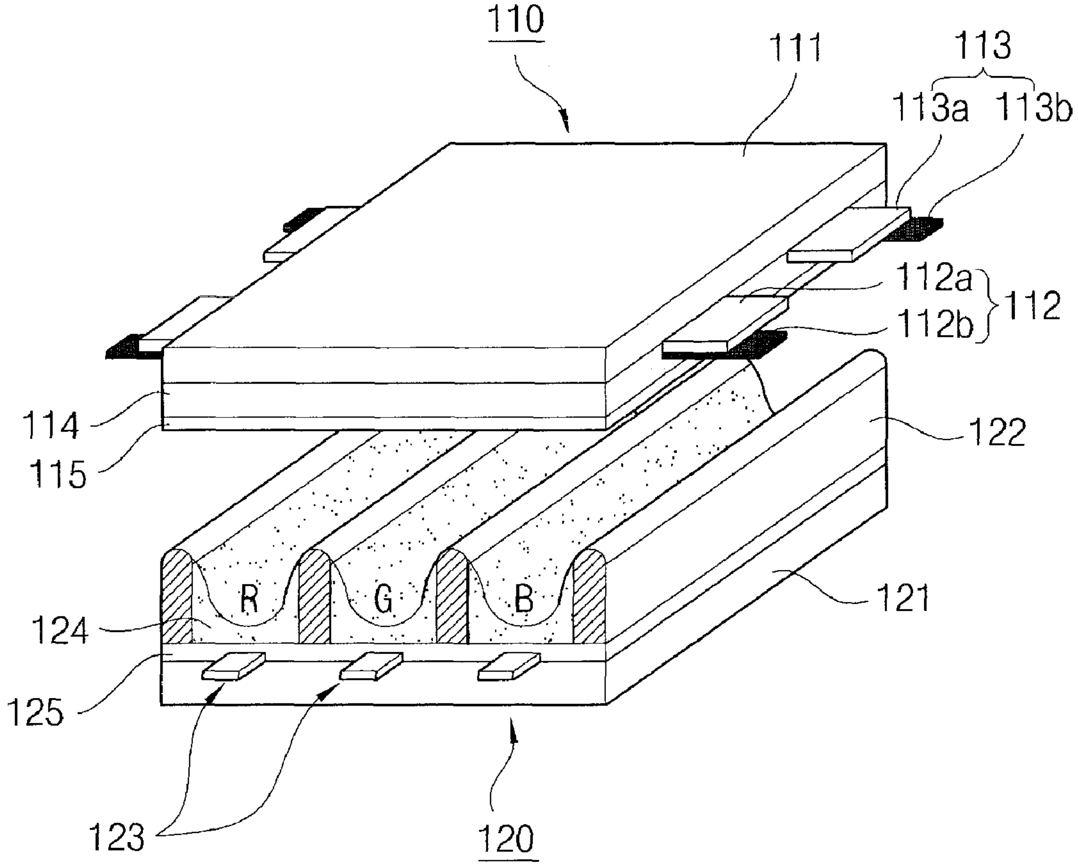
FIG. 2 illustrates the structure of a plasma display panel (PDP) according to an embodiment of the present invention.

FIG. 2 illustrates the structure of a plasma display panel (PDP) according to an of the present invention.

Referring to FIG. 2, the PDP according to an embodiment of the present invention is formed by attaching a top surface panel 110 comprising a top surface substrate 111 on which a scan electrode 112 and a sustain electrode 113 are formed and a bottom surface panel 120 comprising a bottom surface substrate 121 on which address electrodes 123 that intersect the scan electrodes 112 and the sustain electrodes 113 are formed to each other by a predetermined distance.

Here, the scan electrode 112 and the sustain electrode 113 run parallel with each other on the top surface substrate 111 to generate discharge in discharge cells Cell and to sustain the discharge of the discharge cells.

The scan electrode 112 and the sustain electrode 113 comprise bus electrodes 112*b* and 113*b* made of a metal such as Ag and transparent electrodes 112*a* and 113*a* made of transparent indium tin oxide (ITO).

An upper dielectric layer 114 can be formed on the top surface substrate 111 where the scan electrode 112 and the sustain electrode 113 are formed to cover the scan electrode 112 and the sustain electrode 113.

The upper dielectric layer 114 limits the discharge current of the scan electrode 112 and the sustain electrode 113 to insulate the scan electrode 112 from the sustain electrode 113

A protective layer 115 for facilitating discharge can be formed on the upper dielectric layer 114. The protective layer 115 can be made of a material having a high secondary electron emission coefficient such as magnesium oxide (MgO).

On the other hand, the address electrodes 123 formed on the bottom surface substrate 121 supply the data signals Data to the discharge cells.

A lower dielectric layer 125 can be formed on the bottom surface substrate 121 where the address electrodes 123 are formed to cover the address electrodes 123.

Barrier ribs 122 for partitioning off discharge spaces, that is, the discharge cells are formed on the lower dielectric layer 125. Phosphor layers 124 for emitting visible rays for displaying an image during address discharge are formed in the discharge cells partitioned off by the barrier ribs 122. For example, red (R), green (G), and blue (B) phosphor layers can be formed.

In the PDP according to an embodiment of the present invention as described above, when driving signals are supplied to the scan electrode 112, the sustain electrode 113, and the address electrodes 123, discharge is generated by the discharge cells partitioned off by the barrier ribs to display an image.

In FIG. 2, the PDP according to an embodiment of the present invention is illustrated and described. However, the present invention is not limited to the above.

The operation of the plasma display apparatus according to an embodiment of the present invention comprising the PDP will be described with reference to FIGS. 3 and 4.

Figure 3:
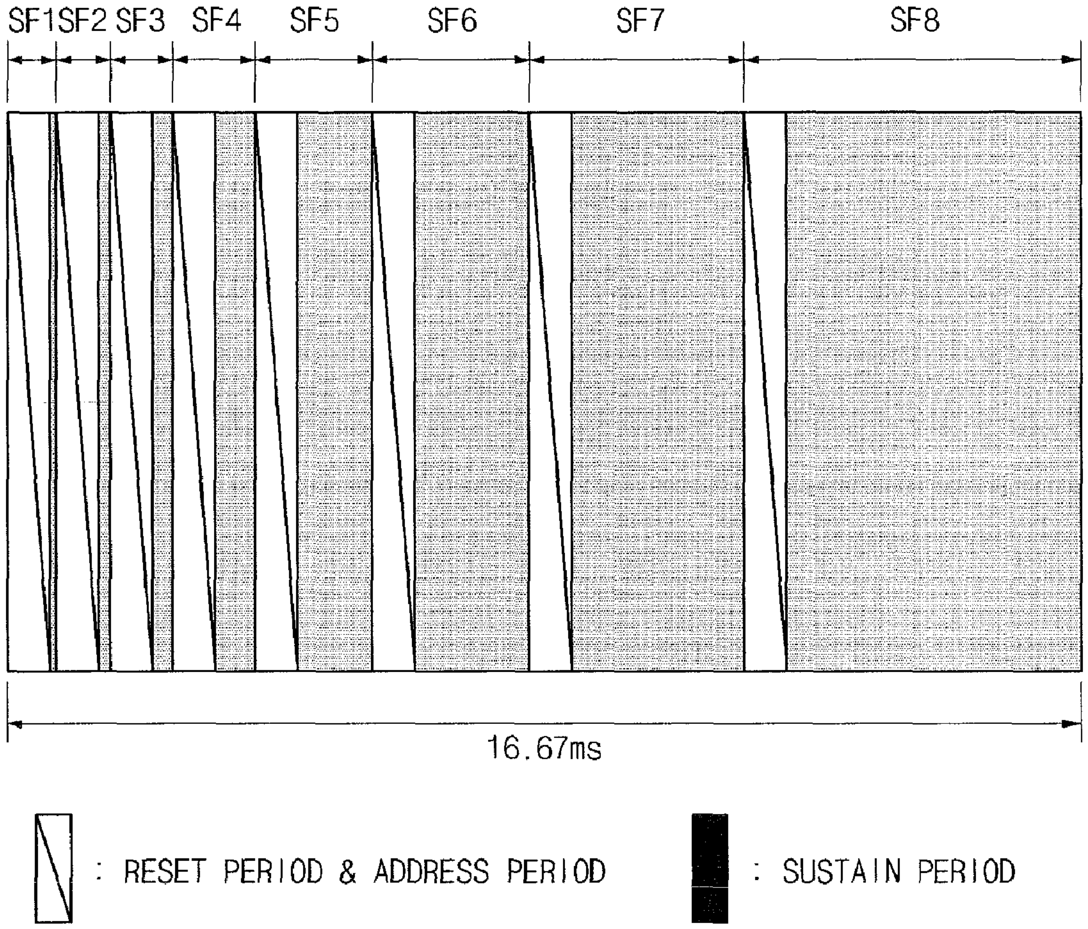
FIG. 3 illustrates a frame for displaying the gray levels of an image in a method of driving the plasma display apparatus according to an embodiment of the present invention.

FIG. 3 illustrates a frame for displaying the gray levels of an image in a method of driving the plasma display apparatus according to an embodiment of the present invention. FIG. 4 describes the operation of the method of driving the plasma display apparatus according to an embodiment of the present invention.

First, referring to FIG. 3, in the plasma display apparatus according to an embodiment of the present invention, a frame for realizing the gray levels of an image is divided into various subfields having different number of times of emission.

In addition, although not shown, each of the subfields can be divided into a reset period for initializing all of the discharge cells, an address period for selecting discharge cells to be discharged, and a sustain period for realizing gray levels in accordance with the number of times of discharge.

For example, when an image is to be displayed by 256 gray levels, a frame period (16.67 ms) corresponding to 1/60 second is divided into, for example, eight subfields SF1 to SF8 as illustrated in FIG. 3 and each of the eight subfields SF1 to SF8 is divided into a reset period, an address period, and a sustain period. At least one of the reset period and the sustain period can be omitted from at least one subfield in consideration of a driving margin and gray level display.

On the other hand, the number of sustain signals supplied in the sustain period can be controlled to set the gray level weight value of a corresponding subfield. For example, the gray level weight value of each of the subfields can be determined so that the gray level weight value of each of the subfields increases in the ratio of $2^n$ (n=0, 1, 2, 3, 4, 5, 6, and 7) by setting the gray level weight value of the first subfield as $2^0$ and by setting the gray level weight value of the second subfield as $2^1$. As described above, the number of sustain signals supplied in the sustain period of each of the subfields is controlled in accordance with the gray level weight value of each of the subfields to realize the gray levels of various images.

Figure 4:
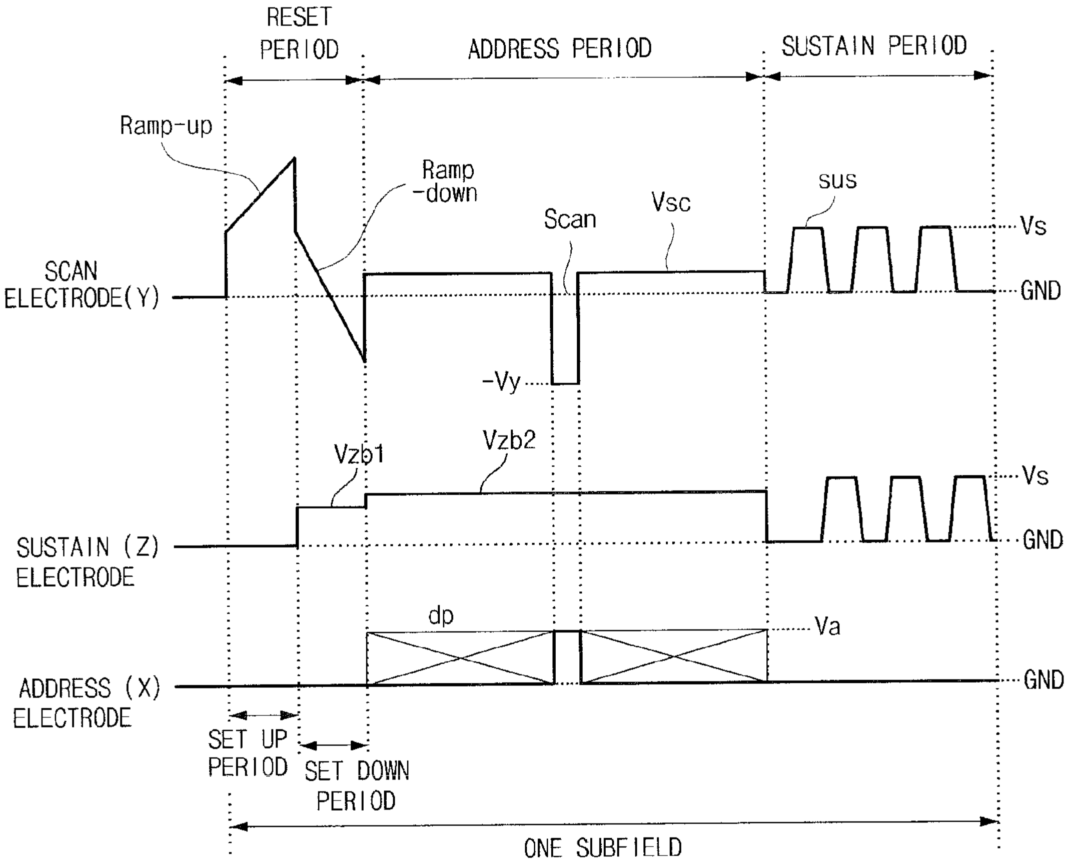
FIG. 4 describes the operation of the method of driving the plasma display apparatus according to an embodiment of the present invention.

FIG. 4 illustrates driving shapes that can be applied to one of the plurality of subfields comprised in the frame of FIG. 3. The scan driver 200, the sustain driver 300, and the data driver 400 described in FIG. 1 supply the driving signals to the scan electrodes Y, the sustain electrodes Z, and the address electrodes X in at least one period of the reset period, the address period, and the sustain period.

The scan driver 200 can supply reset rising signals Ramp-up to the scan electrodes Y in the set up period of the reset period. Positive polar wall charges are accumulated on the address electrodes X and the sustain electrodes Z and negative polar wall charges are accumulated on the scan electrodes Y due to set up discharge.

The voltage of the rising reset signals gradually increases from a voltage no more than a discharge start voltage to a voltage larger than the discharge start voltage.

In addition, the scan driver 200 supplies the reset rising signals to the scan electrodes Y in the set up period and then, can supply reset falling signals Ramp-down that start to fall from a positive polar voltage and that fall to a specific voltage level no more than a ground voltage level GND in the set down period.

Therefore, weak erase discharge is generated in the discharge cells so that wall charges excessively formed in the discharge cells can be sufficiently erased.

In addition, the scan driver 200 makes the periods in which the lowest voltages of the reset signals are supplied the same from the first subfield to the fourth subfield provided earliest among the plurality of subfields and reduces the periods in which the lowest voltages of the reset signals are supplied in the remaining subfields excluding the first to fourth subfields to supply the control signals CTRL to the scan electrodes Y1 to Yn when the temperature or the peripheral temperature of the PDP is higher than the reference temperature.

The sustain driver 300 supplies a sustain bias voltage Vzb to the sustain electrodes Z in the set down period and the address period. The sustain bias voltage Vzb comprises a first sustain bias voltage Vab1 and a second sustain bias voltage Vzb2. The sustain driver 300 supplies the first sustain bias voltage Vzb1 to the sustain electrodes Z in the set down period and supplies the second sustain bias voltage Vzb2 to the sustain electrodes Z in the address period to prevent discharge from being generated between the sustain electrodes Z and the address electrodes X and to prevent erroneous discharge from being generated.

At this time, the first sustain bias voltage Vzb1 comprised in the sustain bias signals Vzb is actually smaller than the second sustain bias voltage Vzb2.

This is because the voltage of the sustain bias signals Vzb supplied to the sustain electrodes in the set down period and the address period varies to be supplied so that driving can be effectively performed. In the set down period that requires weak erase discharge, the first sustain bias voltage Vzb1 that can generate erase discharge is supplied. In a period that requires address discharge, the sustain bias voltage Vzb2 that can correctly generate the address discharge is supplied so that a voltage that can be excessively supplied to the scan electrodes can be prevented from being generated.

Therefore, a difference between the first sustain bias voltage and the second sustain bias voltage comprised in the sustain bias signal Vzb can be no less than 2V and no more than 10V. A voltage difference between the first sustain bias voltage and the second sustain bias voltage may be no less than 3V and no more than 5V. Detailed description thereof will be performed in FIG. 5.

In addition, the scan driver 200 can supply negative polar scan signals −Vy that fall from a scan bias voltage Vsc to the scan electrodes Y in the address period. Here, the scan bias voltage Vsc can be larger than the ground voltage level GND.

Furthermore, the scan bias voltage Vsc can be lower than the highest voltage of the sustain signals supplied to the scan electrodes Y in the sustain period and higher than the lowest voltage of the reset signals.

The scan bias voltage Vsc is made larger than the ground voltage level GND so that the negative polar wall charges formed on the scan electrodes Y in the reset period can be firmly accumulated. In addition, when the scan bias voltage Vsc is supplied in the address period, a voltage difference between the scan electrodes Y and the sustain electrodes Z is increased so that the address discharge can be stably generated.

In addition, when the negative polar scan signal Scan is supplied in the address period, a voltage difference between the scan electrodes Y and the sustain electrodes Z is increased so that the address discharge can be stably generated. For example, the scan bias voltage Vsc may be 35V to 55V in consideration of the properness of the address discharge or the facility of controlling the wall charges.

Furthermore, the data driver 400 supplies positive polar data signals dp to the address electrodes X to correspond to a negative polar scan signal Scan.

A voltage difference between the scan signal Scan and the data signals DP and a wall voltage generated in the reset period are added so that the address discharge is generated in the discharge cells to which the data signals dp are supped. Wall charges that can generate discharge when the sustain voltage Vs is supplied are formed in the discharge cells selected by the address discharge.

At this time, the lowest voltage of the reset signals Scan can be lower than the lowest voltage of the sustain signals SUS supplied to the scan electrodes Y in the sustain period and can be higher than the lowest voltage of the scan signals Scan. Therefore, the lowest voltage of the scan signals Scan can be a negative polar voltage lower than the lowest voltage of the reset signals.

A negative polar voltage in which the lowest voltage of the scan signal Scan is lower than the lowest voltage of the reset signals is supplied to the scan electrodes Y so that the highest voltage of the data signals dp can be reduced and that the address discharge can be effectively generated.

In the sustain period after the address period, the scan driver 200 and the sustain driver 300 supply the sustain signals SUS to the scan electrodes Y and the sustain electrodes Z. Therefore, in the discharge cells selected by the address discharge, the wall voltage in the discharge cells and the sustain signals SUS are added to each other so that sustain discharge is generated between the scan electrodes Y and the sustain electrodes Z whenever the sustain signals SUS are supplied.

The driving method was described according to an embodiment of the present invention. The scan driver 200 can supply erases signals EP that erase wall charges left after the sustain discharge after the last sustain signal SUS is supplied in the sustain period to the scan electrodes Y or the sustain electrodes Z.

Here, the erase signals EP can be supplied to the scan electrodes Y or the sustain electrodes Z. As described above, the erase signals EP are supplied so that wall charges can uniformly and effectively reside in the discharge cells. This is because most wall charges non-uniformly formed by the erase discharge caused by the erase signals EP are erased.

The voltage of the erase signals EP is gradually reduced with the lapse of time. At least one of the highest voltage of the erase signals EP, the lowest voltage V1 of the erase signals EP, and the falling slope of the erase signals EP can be actually the same as the highest voltage of the reset signals, the lowest voltage of the reset signals, and the falling slope of the reset signals.

In addition, the erase signals EP can be supplied to the scan electrodes Y in the erase period after the sustain period and can be supplied to the scan electrodes Y in a pre-reset period prior to the reset period.

The erase signals EP are supplied to the scan electrodes Y so that wall charges can be uniformly formed in the discharge cell. Therefore, the erase signals EP only have to be comprised in at least one of the reset period, the sustain period, the erase period, and the pre-reset period to effectively uniformize wall charges in the discharge cells and is not limited to the above.

FIG. 5 describes a relationship between a first sustain bias voltage and a second sustain bias voltage according to an embodiment of the present invention.

In FIG. 5, address discharge, sustain discharge, and erroneous discharge realized while changing a difference between the first sustain bias voltage and the second sustain bias voltage from 1V to 12V are measured.

⊚ represents that wall charges are very smoothly formed in the discharge cells to stably generate the address discharge and to easily generate the sustain discharge and that erroneous discharge is not generated. ○ represents that the sustain discharge is relatively smoothly generated. Δ represents that the sustain discharge is not smoothly generated. .times. represents that the address discharge is unstably generated and the sustain discharge can be unstably generated so that wall charges are excessively or insufficiently formed in the discharge cells and that erroneous discharge is generated.

First, when a difference between the first sustain bias voltage Vzb1 and the second sustain bias voltage Vzb2 is within 2V, the address discharge is smoothly generated, however, wall charges can be excessively formed in the discharge cells after the address discharge so that the sustain discharge is not smoothly generated and that erroneous discharge can be generated. That is, the sustain discharge is not smoothly generated.

In addition, when a difference between the first sustain bias voltage Vzb1 and the second sustain bias voltage Vzb2 is no less than 10V, the address discharge is very smoothly generated, however, wall charges can be insufficiently formed in the discharge cells after the address discharge so that the sustain discharge is not smoothly generated and that erroneous discharge can be generated. That is, the sustain discharge is not smoothly generated so that erroneous discharge is often generated.

In addition, when a difference between the first sustain bias voltage Vzb1 and the second sustain bias voltage Vzb2 is no less than 3V and no more than 10V, the address discharge is very smoothly generated and wall charges are smoothly formed in the discharge cells after the address discharge so that the sustain discharge is easily generated. Therefore probability of generating erroneous discharge is reduced. That is, the sustain discharge as well as the address discharge is smoothly generated so that erroneous discharge is rarely generated. A difference between the first sustain bias voltage Vzb1 and the second sustain bias voltage Vzb2 may be no less than 4V and no more than 6V so that the address discharge and the sustain discharge are stably generated so that erroneous discharge is not generated.

Figure 6:
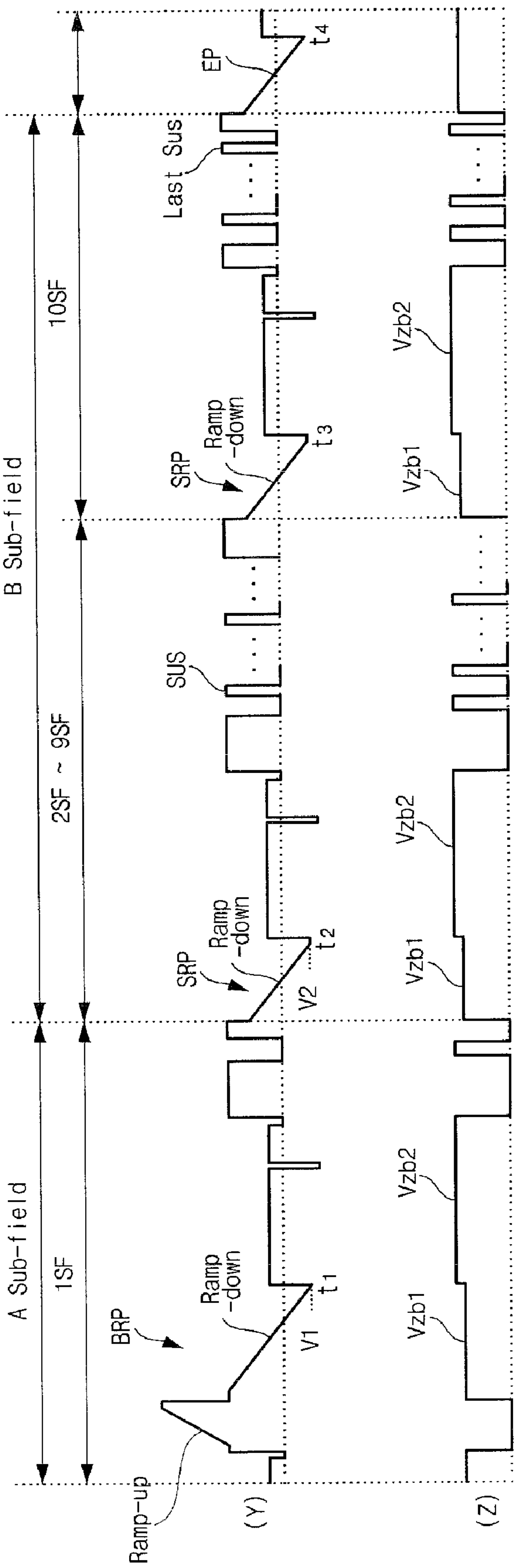
FIG. 6 illustrates driving signals supplied to a plurality of subfields according to an embodiment of the present invention when the temperature or the peripheral temperature of a PDP is a reference temperature.

FIG. 6 illustrates driving signals supplied to a plurality of subfields according to an embodiment of the present invention when the temperature or the peripheral temperature of a PDP is a reference temperature.

Referring to FIG. 6, the scan driver 200 according to an embodiment of the present invention varies a period in which the lowest voltage of the reset signals supplied to the scan electrodes Y in the reset period with each of the plurality of subfields when the temperature or the peripheral temperature of the PDP deviates from the reference temperature.

Since the frame consisting of the plurality of subfields 1SF to 10SF was fully described in FIG. 3, detailed description thereof will be omitted.

Reset signals BPR comprise the reset rising signals Ramp-up that rise to the highest voltage of the reset signals and the reset falling signals Ramp-down.

An A subfield 1SF is provided earliest among the plurality of subfields 1SF to 10SF. The reset signal BRP supplied to the scan electrodes Y in the reset period of the A subfield 1SF comprise the reset rising signals Ramp-up and the reset falling signals Ramp-down. In the reset periods of B subfields 2SF to 10SF that are the remaining subfields excluding the A subfield 1SF, reset signals SRP supplied to the scan electrodes Y comprise only the reset falling signals Ramp-down. Therefore, the voltage swing width of the reset signal supplied to the A subfield 1SF is larger than the voltage swing width of the reset signals SRP supplied to the remaining subfields.

This is because the voltage of the reset signal BRP of the A subfield 1SF is made larger than the voltage swing width of the reset signals SRP of the B subfields 2SF to 10SF so that the resets are supplied to the scan electrodes Y. Therefore, wall charges can be sufficiently accumulated in the discharge cells of an entire screen and wall charges formed in the discharge cells can be sufficiently erased so that wall charges can uniformly reside in the discharge cells.

In addition, an a sustain period t1 in which the lowest voltage of the reset signal supplied to the scan electrodes Y of the A subfield 1SF among the plurality of subfields 1SF to 10SF is supplied can be shorter than a b sustain period t2 and a c sustain period t3 in which the lowest voltages of the reset signals supplied to the scan electrodes Y of the B subfields 2SF to 10SF.

As the a, b, and c sustain periods t1, t2, and t3 in which the lowest voltages of the reset signals are supplied increase, a period in which wall charges formed in the discharge cells are erased increases so that wall charges can be uniformly formed in the discharge cells. That is, in the A subfield 1SF, the amount of wall charges generated by the reset rising signals Ramp-up whose voltage gradually increases can be smaller than the amount of wall charges formed by the last sustain signal Last Sus that helps the reset period of the next subfield in the B subfields 2SF to 10SF.

That is, most wall charges in the discharge cells are erased by the erase signals EP supplied to the last subfield of a previous frame are erased so that the amount of priming particles is small and that the amount of wall charges formed by the reset rising signals Ramp-up supplied in the A subfield 1SF can be smaller than when the erase signals EP are not supplied. Therefore, in the A subfield 1SF, the amount of wall charges erased so that the a sustain period t1 is smaller than the b and c sustain periods t2 and t3 needs to be smaller than the amount of wall charges erased in the reset periods of the B subfields 2SF to 10SF.

In addition, a sustain period t4 in which the lowest voltage of the erase signal EP supplied to the last subfield is sustained is made actually the same as the a sustain period t1 of the A subfield so that the priming particles are not excessively erased.

On the other hand, according to an embodiment of the present invention, the lowest voltage V1 in the reset period of the A subfield 1SF can be smaller than the lowest voltage V2 in the reset periods of the B subfields 2SF to 10SF.

That is, the absolute value of the lowest voltage V1 in the reset period of the A subfield 1SF can be smaller than the absolute value of the lowest voltage in the reset periods of the B subfields 2SF to 10SF. The lowest voltage V1 in the reset period of the A subfield 1SF can be no less than −100V and no more than −95V. The lowest voltage V2 in the reset periods of the B subfields 2SF to 10SF can be no less than −90V and no more than −80V.

Therefore, the entire time of the reset periods is reduced to secure driving margin.

The second sustain bias voltage Vzb2 supplied to the sustain electrodes Z as illustrated in FIG. 4 can be supplied to actually correspond to a point of time at which the a sustain period t1, the b sustain period t2, or the c sustain period t3 is terminated. This is because, when the second sustain bias voltage Vzb2 is rapidly supplied to the a sustain period t1, the b sustain period t2, or the c sustain period t3, noise can be generated by the a sustain period t1 or the b sustain period t2 of the reset falling signals supplied to the scan electrodes Y to deteriorate the reliability of driving. On the other hand, the second sustain bias voltage Vzb2 of the A subfield can be different from the second sustain bias voltage Vzb2 of the B subfield. That is, the second sustain bias voltage Vzb2 in the A subfield 1SF can be larger than the second sustain bias voltage Vzb2 in the B subfields.

Since the A subfield 1SF commonly displays lower gray levels than the b subfields 2SF to 10SF, the number of turned on discharge cells is small. Therefore, the turned on discharge cells cannot expect priming effect from peripheral discharge cells since little discharge cells are turned on in the vicinity. Therefore, the amount of wall charges accumulated by the address discharge in the address period can be insufficient. In this case, although the sustain signals are supplied in the sustain period, the sustain discharge may not be generated due to insufficient wall charges. Therefore, in order to form sufficient wall charges in the address period of the A subfield 1SF, the second sustain bias voltage Vzb2 can be made larger than the second sustain bias voltage Vzb2 in the B subfields 2SF to 10SF.

On the other hand, in the B subfields 2SF to 10SF excluding the A subfield 1SF, since relatively high gray levels are displayed, the second sustain bias voltage Vzb2 needs not be high. For example, when the second sustain bias voltage Vzb2 equal to the second sustain bias voltage Vzb2 supplied in the A subfield 1SF is supplied in the B subfields, wall charges are excessively formed in the address period so that undesired discharge can be generated in non-discharge cells in the sustain period.

Figure 7:
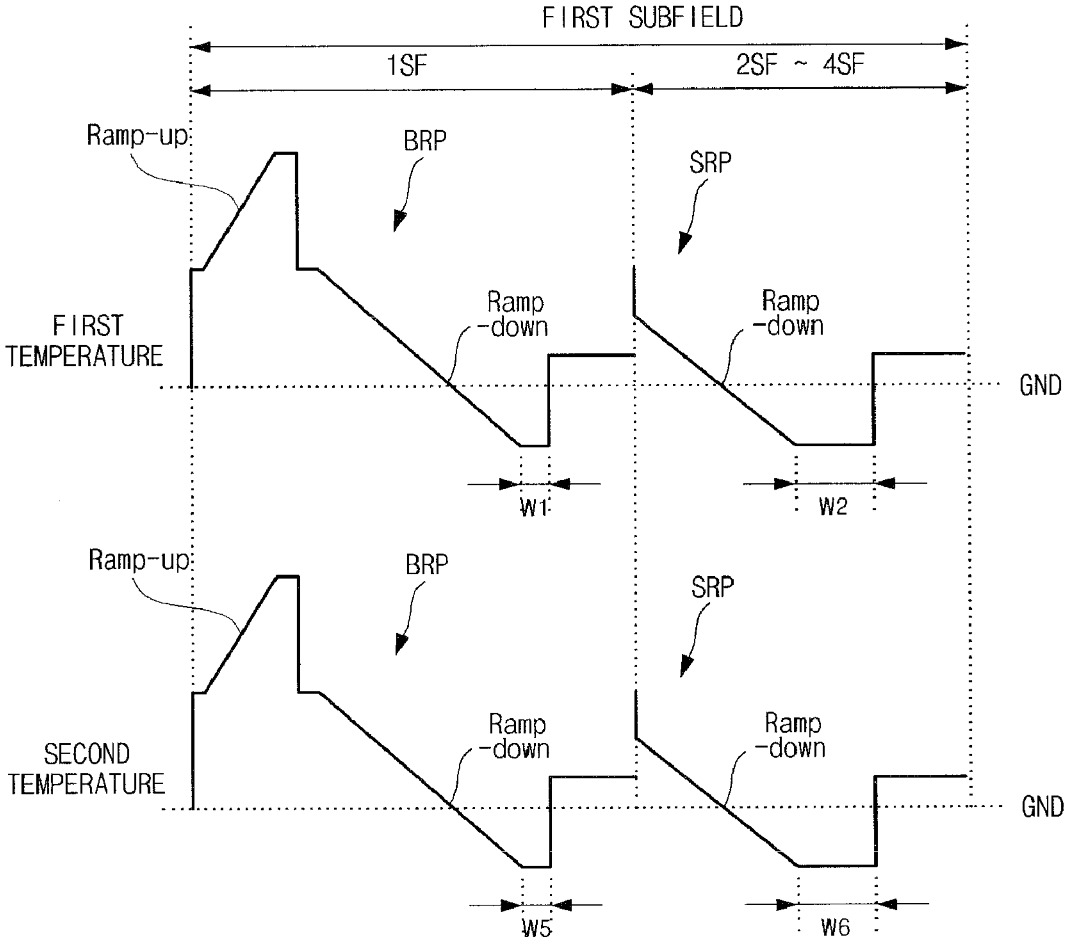
FIGS. 7 and 8 illustrate driving signals supplied to a plurality of subfields according to an embodiment of the present invention when the temperature or the peripheral temperature of a PDP is higher than the reference temperature.
Figure 8:
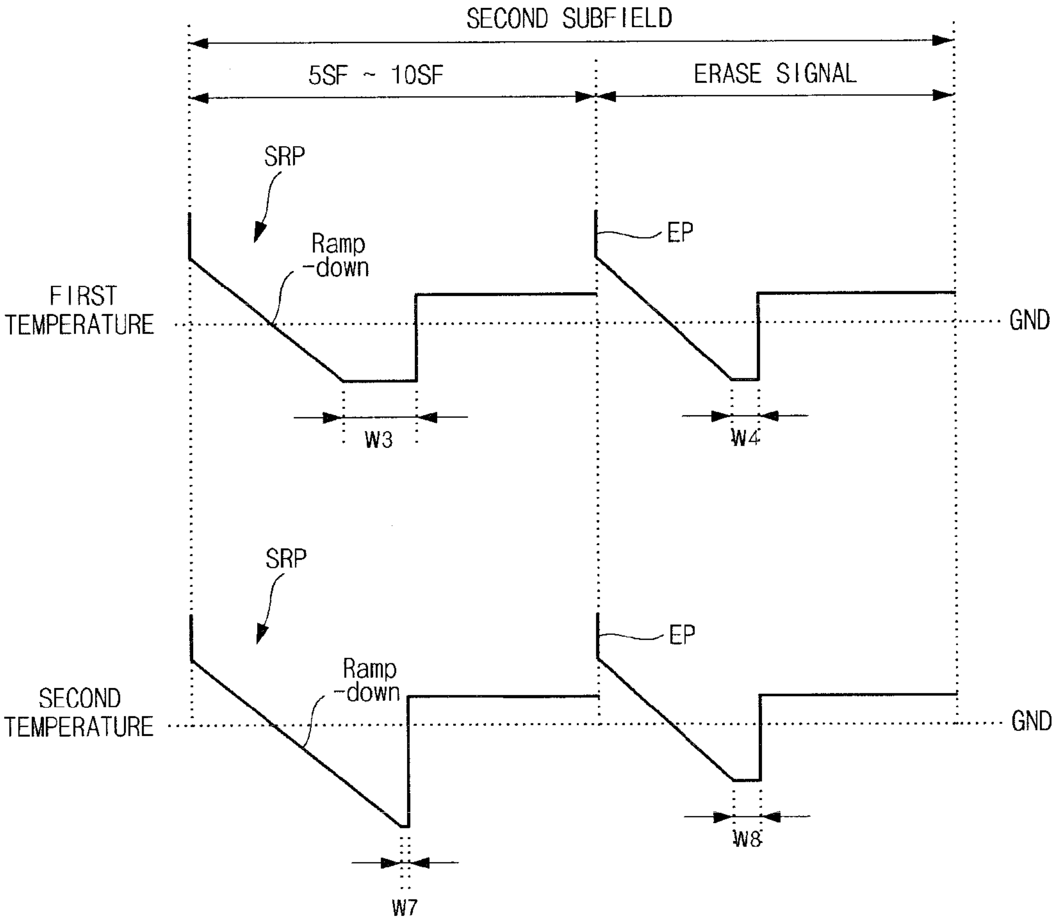

FIGS. 7 and 8 illustrate driving signals supplied to a plurality of subfields according to an embodiment of the present invention when the temperature or the peripheral temperature of a PDP is higher than the reference temperature.

The reference temperature according to an embodiment of the present invention is a room temperature no less than 0 degree and no more than 40 degrees and a temperature higher than the reference temperature is a high temperature larger than 40 degrees. In FIGS. 7 and 8, the reference temperature is a first temperature and the temperature higher than the reference temperature is a second temperature.

In temperature driving according to an embodiment of the present invention, at the first temperature and the second temperature, in the reset periods of the PDP, the length of a period in which the lowest voltage of the reset falling signals Ramp-down supplied to the scan electrodes is sustained varies with at least one subfield.

At this time, the plurality of subfields comprise first subfields and second subfields.

Here, the first subfields are first to fourth subfields provided earliest among the plurality of subfields and the second subfields the remaining subfields excluding the first subfields.

Referring to FIGS. 7 and 8, when the temperature or the peripheral temperature of the PDP is equal to the first temperature, periods in which the lowest voltage of the reset signals is supplied in the reset periods of the first subfields are referred to as first maintenance periods w1 and w2. Periods in which the lowest voltage of the reset signals is supplied in the reset periods of the second subfields are referred to as a second maintenance period w3. In the case where the temperature or the peripheral temperature of the PDP rises to the second temperature, when periods in which the lowest voltage of the reset signals is supplied in the reset periods of the first subfields are referred to as third maintenance periods w5 and w6 and periods in which the lowest voltage of the reset signals is supplied in the reset periods of the second subfields are referred as a fourth maintenance period w7, the second maintenance period w3 can be actually longer than the fourth maintenance period w7.

In the first subfield 1SF of the first subfields, the reset signals BRP supplied at the first and second temperatures are almost similar and the sustain period of the lowest voltage is actually the same as w1. For example, w1 can be set as 5 μs to 15 μs.

In the second to fourth subfields 2SF to 4SF in the first subfield, the reset falling signals SRP supplied at the first and second temperatures are almost similar and the sustain period of the lowest voltage is actually the same as w2. For example, w2 can be set as 20 μs to 40 μs.

On the other hand, in the fifth to tenth subfields 5SF to 10Sf of the second subfield, the reset falling signals SRP supplied at the first and second temperature are almost similar, however, the sustain periods of the lowest voltage are different from each other as w3 and w7.

That is, the sustain period w7 of the lowest voltage when the PDP is driven at the second temperature can be shorter than the lowest voltage sustain period w3 when the PDP is driven at the reference temperature. Here, the tenth subfield 10SF is the last subfield among the plurality of subfields that constitute one frame.

Finally, in the erase signals supplied to the last subfield, the erase signals are almost similar at the first and second temperature and the sustain periods of the lowest voltage are actually the same as w4 and w8. For example, w4 can be actually the same as w1 that is the sustain period of the lowest voltage of the first subfield 1SF.

On the other hand, hereafter, the reason why the sustain period of the lowest voltage varies in accordance with the driving temperature by each subfield will be described according to an embodiment of the present invention.

At the first temperature, in the first subfield 1SF, the amount of wall charges generated by the reset rising signals Ramp-up whose voltage is gradually increased can be smaller than the amount of wall charges formed by the last sustain signal that helps the reset period of the next subfield in the remaining subfields 2SF to 10SF. Therefore, most wall charges in the discharge cells are erased by the erase signals EP supplied to the last subfield of a previous frame so that the amount of priming particles is small. Therefore, the amount of wall charges formed by the reset rising signals Ramp-up supplied to the first subfield 1SF can be smaller than when the erase signals EP are not supplied.

Therefore, w1 that is the sustain period of the lowest voltage is smaller than the sustain periods w2 and w3 that are the sustain periods of the lowest voltage in the remaining subfields to reduce the amount of erased wall charges.

On the other hand, in the remaining subfields 2SF to 10Sf excluding the first subfield 1SF, since the amount of wall charges is large due to the last sustain discharge generated in a previous subfield, the sustain periods of the lowest voltage are increased as w2 and w3 so that wall charges are sufficiently erased and that the state of the discharge cells is stabilized to be advantageous to the address discharge.

In addition, w4 that is the sustain period of the lowest voltage of the erase signals EP supplied to the last subfield is made small so that priming particles for initializing the initial subfield of the next frame are not excessively erased.

On the other hand, as the temperature of the PDP increases, the thermal movement speed of space charges and charged particles increase so that re-combination is actively generated to increase the loss of the space charges and the wall charges of discharge spaces. Furthermore, when the amount of space charges and charged particles is large, the loss of the space charges and the wall charges increases.

At the second temperature, in the first subfield 1SF, since the priming particles are sufficiently reduced due to the erase signals EP supplied to the last subfield of a previous frame, the amount of wall charges accumulated in the reset rising signals Ramp-up is not larger than in the remaining subfields 2SF to 10SF.

Therefore, since the loss of the space charges or the wall charges in accordance with increase in the driving temperature doe not remarkably increase in comparison with the case of the reference temperature, the sustain period w5 of the lowest voltage can be w1 actually the same as the first temperature in consideration of the stably address discharge.

That is, when the sustain period of the lowest voltage is reduced than the first temperature in consideration of the additional loss of the wall charges in accordance with the increase in the temperature in the first subfield 1SF, wall charges are not sufficiently erased so that an address discharge characteristic can deteriorate.

In addition, according to an embodiment of the present invention, since the second to fourth subfields 2SF to 4SF display low gray levels, the number of sustain signals supplied in the sustain period is remarkably smaller than in the fifth to tenth subfields 5SF to 10SF. Therefore, in the second to fourth subfields 2SF to 4SF, the amount of wall charges formed in the sustain period of a previous subfield is smaller than the amount of wall charges formed in the fifth to tenth subfields 5SF to 10SF so that the loss of wall charges in accordance with the increase in the temperature can be small.

Therefore, at the second temperature, the sustain period w6 of the lowest voltage of the second to fourth subfields 2SF to 4SF is made w2 actually the same as the sustain period of the lowest voltage at the first temperature to sufficiently erase wall charges.

On the other hand, at the second temperature, since the fifth to tenth subfields 5SF to 10SF display high gray levels, the number of sustain signals supplied in the sustain period is larger than in the second to fourth subfields 2SF to 4SF. Therefore, in the fifth to tenth subfields 5SF to 10SF, the amount of wall charges formed in the sustain period of a previous subfield is larger than the amount of wall charges formed in the second to fourth subfields 2SF to 4SF so that the loss of wall charges in accordance with the increase in the temperature remarkably increases.

Therefore, at the second temperature, the sustain period of the lowest voltage of the fifth to tenth subfields 5SF to 10SF is made w7 smaller than the sustain period of the lowest voltage at the reference temperature so that wall charges are not excessively lost. According to an embodiment of the present invention, w7 is smaller than w3 applied to the same subfields at the first temperature or w2 and w6 applied to the second to fourth subfields 2SF to 4SF. In addition, w7 can be smaller than w1, w4, w5, and w8 that are the sustain periods of the lowest voltage of the erase signals of the first subfield 1SF and the last subfield. For example, w7 can be 2 μs to 10 μs. When w7 is smaller than 2 μs, the function of stabilizing the discharge cells that is the function of the reset falling signals Ramp-down can be rarely performed. When w7 is larger than 10 μs, wall charges are excessively erased so that the address discharge is not smoothly generated.

Finally, at the second temperature, the sustain period w8 of the lowest voltage of the erase signal supplied to the last subfield can be made w4 actually the same as the sustain period of the lowest voltage at the first temperature in order to form sufficient wall charges in the first subfield 1SF of the next frame.

On the other hand, according to an embodiment of the present invention, in the fifth to final subfields 5SF to 10SF, the sustain period of the lowest voltage of the reset falling signals Ramp-down varies in accordance with the temperature. The number of subfields to which the temperature driving is applied or the initial subfield can vary.

In addition, the temperature driving according to an embodiment of the present invention can be applied to the arrangement of electrodes vulnerable to high temperature erroneous discharge. For example, the scan electrodes Y and the sustain electrodes Z provided in the PDP can be continuously arranged. That is, like an electrode structure (hereinafter, referred to as an YZZY structure) in which the electrodes are arranged in the order of the scan electrodes Y, the sustain electrodes Z, the sustain electrodes Z, and the san electrodes Y, the two electrodes having the same function are continuously arranged. In the YZZY structure, scanning is not sequentially performed. That is, odd scan electrodes Y are first scanned and then, even scan electrodes Y are scanned or the even scan electrodes Y are first scanned and then, the odd scan electrodes Y are scanned. In this case, the amount of wall charges formed in the discharge cells of the later scanned scan electrodes Y is reduced due to the address discharge of the first scanned scan electrodes Y. Therefore, according to an embodiment of the present invention, it is required to reduce the sustain period of the lowest voltage of the reset falling signals Ramp-down of the plurality of subfields that display high gray levels.

Furthermore, in the YZZY structure, as described above, the loss of wall charges in the scan electrodes Y scanned later increases more. The sustain period of the lowest voltage of the reset falling signals can be reduced than at the reference temperature in the subfields that display low gray levels.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A plasma display apparatus comprising:

a plasma display panel comprising scan electrodes and sustain electrodes;

a sensor unit for detecting a temperature or a peripheral temperature of the PDP; and a scan driver for supplying reset signals to the scan electrodes in a reset period of at least one subfield among a plurality of subfields at a predetermined reference temperature so that a first period in which a lowest voltage of the reset signal is supplied is different from a supply period of a lowest voltage when the temperature or the peripheral temperature of the PDP deviates the predetermined reference temperature, wherein:

when the temperature or the peripheral temperature of the PDP is comprised in the reference temperature, maintenance periods in which the lowest voltage of the reset signals are supplied in reset periods of the first subfields are referred to as first maintenance periods and maintenance periods in which the lowest voltage of the reset signals are supplied in reset periods of the second subfields are referred to as second maintenance period, and when the temperature or the peripheral temperature of the PDP is higher than the reference temperature, maintenance periods in which the lowest voltage of the reset signals are supplied in reset periods of the first subfields are referred to as third maintenance periods and maintenance periods in which the lowest voltage of the reset signals are supplied in reset periods of the second subfields are referred to as fourth maintenance periods, the first maintenance periods and the third maintenance periods are the same and the second maintenance periods are longer than the fourth maintenance period.

2. The plasma display apparatus of claim 1, further comprising a sustain driver for supplying sustain bias signals that rise from a first sustain bias voltage to a second sustain bias voltage to the sustain electrodes to actually correspond to a point of time at which the lowest voltage of the reset signals is terminated.

3. The plasma display apparatus of claim 2, wherein a difference between the first sustain bias voltage and the second sustain bias voltage is no less than 2V and no more than 10V.

4. The plasma display apparatus of claim 1, wherein the first subfields are a first subfield to a fourth subfield provided earliest among the plurality of subfields.

5. The plasma display apparatus of claim 1, wherein the first maintenance periods and the third maintenance periods are no less than 5 μs and no more than 15 μs.

6. The plasma display apparatus of claim 1, wherein the second maintenance periods are no less than 20 μs and no more than 40 μs, and wherein the fourth maintenance periods are no less than 2 μs and no more than 10 μs.

7. The plasma display apparatus of claim 2, wherein, in at least one subfield among the plurality of subfields, after a last sustain signal is supplied, erase signals are supplied to the scan electrodes or the sustain electrodes.

8. The plasma display apparatus of claim 7, wherein periods in which the lowest voltage of the erase signals is supplied are actually the same as the first maintenance periods or the third maintenance periods.

9. The plasma display apparatus of claim 1, wherein the reference temperature is no less than 0 degree and no more than 40 degrees.

10. The plasma display apparatus of claim 1, the scan electrodes or the sustain electrodes are continuously arranged in at least one region of the PDP.

11. A method of driving a plasma display apparatus comprising scan electrodes and sustain electrodes, the method comprising:

detecting a temperature or a peripheral temperature of the PDP; and supplying reset signals to the scan electrodes in a reset period of at least one subfield among a plurality of subfields at a predetermined reference temperature so that a first period in which a lowest voltage of the reset signal is supplied is different from a supply period of a lowest voltage when the temperature or the peripheral temperature of the PDP deviates the predetermined reference temperature, wherein:

when the temperature or the peripheral temperature of the PDP is comprised in the reference temperature, maintenance periods in which the lowest voltage of the reset signals are supplied in reset periods of the first subfields are referred to as first maintenance periods and maintenance periods in which the lowest voltage of the reset signals are supplied in reset periods of the second subfields are referred to as second maintenance periods, when the temperature or the peripheral temperature of the PDP is higher than the reference temperature, maintenance periods in which the lowest voltage of the reset signals are supplied in reset periods of the first subfields are referred to as third maintenance periods and maintenance periods in which the lowest voltage of the reset signals are supplied in reset periods of the second subfields are referred to as fourth maintenance periods, and the first maintenance periods and the third maintenance periods are the same and the second maintenance periods are longer than the fourth maintenance periods.

12. The method of claim 11, further comprising a sustain driver for supplying sustain bias signals that rise from a first sustain bias voltage to a second sustain bias voltage to the sustain electrodes to actually correspond to a point of time at which the lowest voltage of the reset signals is terminated.

13. The method of claim 11, wherein the first subfields are a first subfield to a fourth subfield provided earliest among the plurality of subfields.

14. The method of claim 11, wherein, in at least one subfield among the plurality of subfields, after a last sustain signal is supplied, erase signals are supplied to the scan electrodes or the sustain electrodes.

15. The method of claim 14, wherein periods in which the lowest voltage of the erase signals is supplied are actually the same as the first maintenance periods or the third maintenance periods.

16. The method of claim 11, wherein the first maintenance periods and the third maintenance periods are no less than 5 μs and no more than 15 μs, wherein the second maintenance periods are no less than 20 μs and no more than 40 μs, and wherein the fourth maintenance periods are no less than 2 μs and no more than 10 μs.

17. The method of claim 11, wherein the reference temperature is no less than 0 degree and no more than 40 degrees.

* * * * *